US008991835B1

(12) United States Patent
Wolf et al.

(10) Patent No.: US 8,991,835 B1
(45) Date of Patent: Mar. 31, 2015

(54) LIGHTWEIGHT PLASTIC SLEDS FOR EMERGENCY TRANSPORT AND HAULING OF LOADS

(71) Applicant: ARC Products LLC, Des Peres, MO (US)

(72) Inventors: Bryan A. Wolf, Des Peres, MO (US); Clifford G. Adkins, Imperial, MO (US)

(73) Assignee: ARC Products, LLC, Des Peres, MO (US)

( * ) Notice: Subject to any disclaimer, the term of this patent is extended or adjusted under 35 U.S.C. 154(b) by 0 days.

(21) Appl. No.: 13/717,306

(22) Filed: Dec. 17, 2012

Related U.S. Application Data

(63) Continuation of application No. 13/461,450, filed on May 1, 2012, now Pat. No. 8,333,392, which is a continuation of application No. 12/814,796, filed on Jun. 14, 2010, now Pat. No. 8,172,238, which is a continuation of application No. 11/123,568, filed on May 6, 2005, now Pat. No. 7,810,820.

(51) Int. Cl.
*B62B 15/00* (2006.01)
*A61G 1/003* (2006.01)

(52) U.S. Cl.
CPC .............. *A61G 1/003* (2013.01); *B62B 15/007* (2013.01)
USPC .................................. 280/19; 280/18; 5/628

(58) Field of Classification Search
CPC ......... A61G 1/01; A61G 1/044; A61G 1/048; B62B 15/00; B62B 15/007; B62B 17/00; B62B 17/005
USPC ............ 280/18, 19; 224/156, 158; 5/625–629
See application file for complete search history.

(56) References Cited

U.S. PATENT DOCUMENTS

| | | | |
|---|---|---|---|
| 2,788,530 A | | 4/1957 | Ferguson |
| 2,974,971 A | | 3/1961 | Buck |
| 3,034,800 A | * | 5/1962 | Campbell ........................ 280/18 |
| 3,145,400 A | * | 8/1964 | Yoakum .......................... 441/65 |
| 3,319,972 A | * | 5/1967 | Gallaher ......................... 280/18 |
| 3,432,181 A | | 3/1969 | McKee |
| 3,771,808 A | | 11/1973 | Duerst |
| 3,912,290 A | | 10/1975 | Rich |
| 4,173,351 A | | 11/1979 | Hetland |
| 4,283,068 A | | 8/1981 | Keyser |
| 4,335,891 A | | 6/1982 | Alley et al. |
| 4,405,673 A | | 9/1983 | Fridley et al. |
| 4,693,504 A | | 9/1987 | Baker |
| 4,712,258 A | | 12/1987 | Eves |
| 4,744,115 A | | 5/1988 | Marchione |
| 4,783,862 A | | 11/1988 | Murphy |
| 4,887,823 A | | 12/1989 | Hallett et al. |
| 5,104,133 A | | 4/1992 | Reiner |

(Continued)

OTHER PUBLICATIONS

Skedco Inc., Skedco Rescue / EMS Products Catalog, SKED The Complete Rescue System, Apr. 2004, 16 pages submitted (cover; inside cover; table of contents; pp. 2, 3, 4, 5, 6, 7, 9, 12, 13, 14, 15, and 19; and back cover).

(Continued)

*Primary Examiner* — Hau Phan
*Assistant Examiner* — Travis Coolman
(74) *Attorney, Agent, or Firm* — Senniger Powers

(57) ABSTRACT

Lightweight inexpensive sleds, made of tough plastic or similar material, are disclosed for transporting injured people or inert loads. Tensile towing forces applied to a strap are distributed to avoid tearing the sled body.

19 Claims, 1 Drawing Sheet

(56) References Cited

U.S. PATENT DOCUMENTS

| | | | |
|---|---|---|---|
| 5,121,514 | A | 6/1992 | Rosane |
| D329,216 | S | 9/1992 | Beeley et al. |
| 5,211,434 | A | 5/1993 | Lanava |
| 5,214,813 | A | 6/1993 | Gastle et al. |
| 5,566,413 | A | 10/1996 | Webb et al. |
| 5,634,222 | A * | 6/1997 | Zwickey ............... 5/628 |
| 5,720,303 | A | 2/1998 | Richardson |
| 5,839,137 | A | 11/1998 | Butler et al. |
| 5,978,989 | A * | 11/1999 | Chavez ............... 5/627 |
| 6,017,043 | A | 1/2000 | Bennett et al. |
| D421,413 | S | 3/2000 | Calkin |
| 6,061,853 | A * | 5/2000 | Laaksonen et al. ............... 5/625 |
| 6,206,424 | B1 | 3/2001 | Edwards et al. |
| 6,363,936 | B1 * | 4/2002 | McCormick et al. ......... 128/870 |
| 6,408,962 | B1 | 6/2002 | Ryckman |
| 6,565,101 | B2 | 5/2003 | Jones et al. |
| 6,746,028 | B2 | 6/2004 | Barbee |
| 6,871,368 | B2 | 3/2005 | Calkin |
| 6,942,226 | B2 | 9/2005 | Walkingshaw |
| 7,124,454 | B2 | 10/2006 | Walkingshaw |
| 7,168,110 | B2 * | 1/2007 | Girard et al. ............... 5/89.1 |
| 7,337,484 | B2 * | 3/2008 | Cox ............... 5/625 |
| 7,422,220 | B2 | 9/2008 | Walkingshaw et al. |
| 7,594,754 | B2 | 9/2009 | Costello |
| 7,810,820 | B2 | 10/2010 | Wolf et al. |
| 8,172,238 | B2 | 5/2012 | Wolf et al. |
| 2002/0153680 | A1 | 10/2002 | Moore |
| 2002/0195781 | A1 | 12/2002 | Jones et al. |
| 2004/0026881 | A1 | 2/2004 | Touchette |
| 2007/0158969 | A1 | 7/2007 | Walkingshaw |
| 2007/0182220 | A1 | 8/2007 | Walkingshaw et al. |

OTHER PUBLICATIONS

Med Sled No One Left Behind, literature discussed in Examiner Interview of Nov. 23, 2009 between Kurt James and Travis Coolman, re U.S. Appl. No. 11/123,568, 1 page.

Med Sled No One Left Behind, Evacuation, literature discussed in Examiner Interview of Nov. 23, 2009 between Kurt James and Travis Coolman, re U.S. Appl. No. 11/123,568, 1 page.

Veasey, et al., Confined Space Entry and Emergency Response, McGraw-Hill Professional Publishing, pp. 429-433, 2002.

Med Sled Youth, literature discussed in Examiner Interview of Nov. 23, 2009 between Kurt James and Travis Coolman, re U.S. Appl. No. 11/123,568, 1 page.

Med Sled No One Left Behind Vertical Lift Rescue, literature discussed in Examiner Interview of Nov. 23, 2009 between Kurt James and Travis Coolman, re U.S. Appl. No. 11/123,568, 1 page.

Med Sled First Call for a Safe Removal, literature discussed in Examiner Interview of Nov. 23, 2009 between Kurt James and Travis Coolman, re U.S. Appl. No. 11/123,568, 1 page.

Cassidy, "Health Care Heros, Innovation Winner, Clifford Adkins of ARC Products," St. Louis Business Journal, Oct. 2-8, 2009, Scoop Reprint Source, literature discussed in Examiner Interview of Nov. 23, 2009 between Kurth James and Travis Coolman, re U.S. Appl. No. 11/123,568, 1 page.

Med Sled No One Left Behind Evacuation catalog, literature discussed in Examiner Interview of Nov. 23, 2009 between Kurt James and Travis Coolman, re U.S. Appl. No. 11/123,568, 12 pages.

* cited by examiner

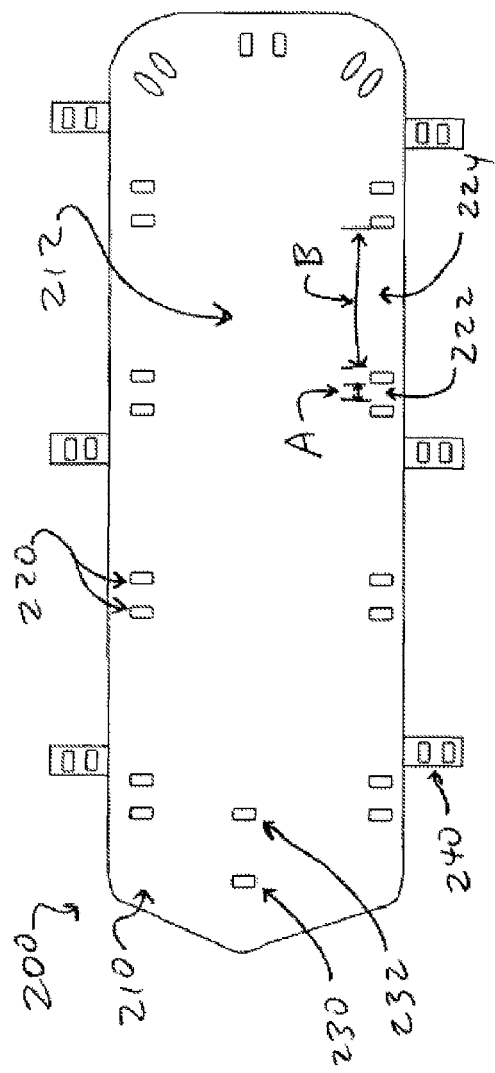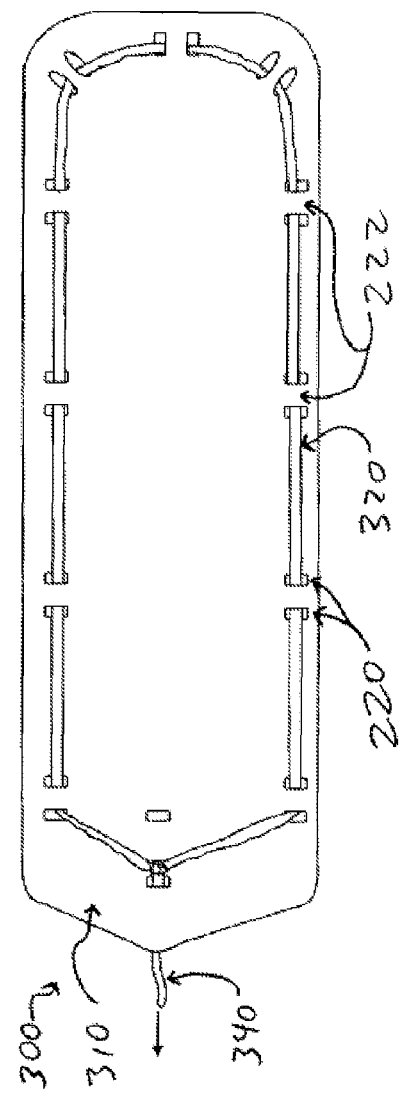
FIG. 1
FIG. 2

US 8,991,835 B1

LIGHTWEIGHT PLASTIC SLEDS FOR EMERGENCY TRANSPORT AND HAULING OF LOADS

RELATED APPLICATIONS

This application is a continuation of application Ser. No. 13/461,450, filed on May 1, 2012, which is a continuation of application Ser. No. 12/814,796, filed on Jun. 14, 2010, which is a continuation of application Ser. No. 11/123,568, filed on May 6, 2005.

FIELD OF THE INVENTION

This invention is in the field of mechanical and molded plastic devices, and relates to a convenient and lightweight sled for use by military or rescue personnel in transporting injured people.

BACKGROUND OF THE INVENTION

People in various situations could benefit substantially from having a simple, convenient, inexpensive, collapsible and easily-transported device that can help transport an injured person, or drag a heavy load.

As one class of circumstances, people such as soldiers, rescue workers, and emergency medical technicians often need a lightweight transporting device that can be hand-carried over uneven terrain (such as through a forest or wetland, down an embankment, etc.), to locations where wheeled gurneys cannot reach, without the weight and cumbersome inconvenience of large and stiff "backboards" of the type carried by ambulances. As one example, soldiers on foot patrol in a hostile area cannot realistically carry or drag around a backboard, for evacuating someone who has been injured by a bomb or attack; similarly, if a rescue person or team must carry a backboard a mile or more into dense woods, to rescue an injured hunter, the weight and awkwardness of the backboard can lead to serious fatigue in the rescuer(s).

A different type of transport device is sold by a company called Skedco, Inc. (www.skedco.com), and what appears to be an earlier and similar version of this sled is shown and described in U.S. Pat. No. 4,283,068 (Keyser 1981). This type of transport device was developed for rescuing and transporting people who have been injured. Briefly, it comprises a flexible sheet of a plastic material that has been provided with securing straps and handle straps. The straps generally pass through metal grommets to reduce the risk of tearing the plastic, and reinforcing devices near the "head" of the plastic sheet (apparently by rivets) reduce the risk of tearing the sled if a person being rescued must be lifted out of a dangerous location in a near-vertical orientation, or if a loaded sled must be pulled and dragged across a rough surface or over a long distance.

The "Sked Rescue System" is the closest prior art known to the Inventors herein. However, that system also suffers from certain shortcomings that limit its use, including its weight and bulk. According to Skedco's 2004 product catalog, the "Sked Basic Rescue System" weighs 19 pounds, and photographs in the catalog make it appear that the unit, when rolled up and stuffed into a carrying sleeve, approaches the size and bulk of a golf bag. Clearly, soldiers on foot patrols in hostile areas are already heavily weighed down by weaponry, protective equipment, communications gear, and enough supplies to cope with a range of emergencies and contingencies, and it is not feasible or realistic to require soldiers under those types of conditions to carry an additional 19-pound load that is nearly the size of a golf bag.

In addition, if a natural disaster, terrorist bombing, or other major crisis occurs that causes numerous casualties, most types of vehicles (such as armored vehicles, helicopters, etc.) could not easily carry more than a few such devices, in addition to everything else they would need to be carrying.

For these and other reasons, although the plastic sleds made by Skedco have become important in rescue and retrieval operations, they rarely are carried into field situations as a matter of routine, before they are known to be needed. Instead, they normally are stored at supporting sites (such as field hospitals for military use, and police, fire, or ranger stations for civilian use). If and when they are carried in land vehicles, the vehicles rarely carry more than one sled, because each unit takes up substantial space and volume.

SUMMARY

In one aspect, the present invention is directed to a sled suited for receiving a human so that an operator may transport the human by towing the sled in a dragging operation. The sled includes a sled body including top and bottom surfaces, a front end, two sides, a tail end, and a length and width that render the sled body capable of receiving a human lying down on the top surface of the sled body to transport the human. The sled body further includes a longitudinal axis, a periphery and a peripheral edge margin extending inward from the periphery. The peripheral edge margin extends around the periphery of the sled body along the front end, two sides, and tail end. The sled body has at least one hole formed in the peripheral edge margin of the sled bod. The at least one hole includes a hole in a portion of the peripheral edge margin adjacent the front end of the sled body. A strap portion is threaded through the hole in the portion of the peripheral edge margin portion adjacent the front end of the sled body. The strap portion has a generally flat cross section and is threaded through the hole in the portion of the peripheral edge margin portion adjacent the front end of the sled body so that the strap portion extends from adjacent the front end of the sled body toward the tail end of the sled body. The strap portion is secured to the sled body and is adapted for pulling by the operator to tow the sled body. At least one segment of the strap portion extends along the sled body and lies in flatwise engagement with the sled body.

BRIEF DESCRIPTION OF THE DRAWINGS

FIG. 1 is a top (plan) view of a "rescue sled", for transporting a person who has been injured, wounded, etc., showing "strap slots" around the periphery of the sled, and having side handles to facilitate securing of a person to the sled.

FIG. 2 depicts a similar rescue sled, showing a strong strap laced through the strap slots. A towing strap is coupled to the peripheral strap, to allow tensile stresses exerted on the straps to be distributed evenly across the body of the sled, to minimize stresses and prevent tearing of the plastic.

DETAILED DESCRIPTION

A "rescue sled" for use in emergency situations to transport people who have been injured can be created by using a combination of: (i) a layer of plastic, which can be thicker and stronger than would be preferred for an ultra-light sled, and (ii) a strong strap, such as a nylon strap with a width of half an inch or more, which can have hundreds or even thousands of pounds of tensile strength. The strap is laced through a series of holes cut through the main sheet, in a way that securely affixes the strap around the periphery of the sled.

The class of sled device disclosed herein is substantially lighter than any previous similar known devices. Weight is a crucial factor for such sleds, and rescue sleds can weigh significantly less than about 5 kilograms (about 11 pounds); indeed, a preferred rescue sled, including the reinforcing strap, weighs only about 6 pounds, which is less than 3 kg. Such sleds also can be rolled into cylindrical form with a diameter less than about 25 cm (10 inches); indeed, a preferred rescue sled can be rolled into a cylinder than 15 cm (6 inches) thick.

In this type of sled, the plastic or polymer sheet can be made from high-density polyethylene (HDPE) or other low-cost plastics or polymers. Sheets of HDPE and various other plastics that can be evaluated for use as disclosed herein are readily available in a range of suitable thicknesses, including sheets that already have both: (i) a smooth surface on one side, which can provide a bottom sled surface that will minimize friction and drag; and (ii) a knurled or otherwise textured surface on the other side, which can reduce and minimize slippage, sliding, and other unwanted motion by a person or other load riding on the sled.

Alternately, the sheet that comprises the main component of the sled can be made from a strong synthetic fabric that has been coated or impregnated with a plastic material; as an example, a search of any Internet search engine using "420D" and "nylon" will lead to manufacturers and sellers of "rip-stop" nylon fabrics that are impregnated or coated with a waterproof plastic, having one smooth side and one textured side, available in various thicknesses.

Still other materials with greater toughness or other elevated or even extreme performance traits also can be used, and may be preferred for military or other uses involving high levels of danger and risk. As examples, materials made from polyaramids (widely sold under the trademark KEVLAR) and "ballistic nylon" are strong enough to be used in bullet-proof vests and other devices. Accordingly, a sled as described herein might be exceptionally useful in helping soldiers protect themselves if ambushed, pinned down in a firefight, exposed to gunfire if they try to rescue someone, or otherwise placed in danger. In addition, if desired, a sled as disclosed herein can be provided with, or accompanied or supplemented by, one or more optional frame or support components, to allow the sheet of material to be used for various additional purposes (such as, for example, a cot for sleeping, a shield, a windbreak, etc.).

In the rescue sleds, any of various means can be used, if desired, to reinforce any holes or slots that are punched, drilled, cut, or otherwise passed through the sheet of material that is used to make a sled. For example, conventional grommets (also called eyes, eyelets, or similar terms) can be inserted into such holes. Typically, grommets made of a metal such as brass are secured by placing two halves with different shapes on different sides of a sheet, and using compression to press the two halves together in a way that causes either or both of the pieces to permanently bend, while grommets made of yieldable plastic typically use "snap" fittings, in which a ring or ridge on one piece fits into a groove on the accommodating piece. Alternately, reinforcements for the holes or slots can be provided by using ultrasonic energy, heat, or glue to securely affix O-rings made of flat plastic to either or both sides of the sheet of material that provides the main body of a sled.

As another optional means for reinforcing holes that pass through a sheet of plastic, such holes can be made by using a heated punch or blade, comparable to a soldering iron. A small quantity of plastic that is heated by the hot punch or blade will melt, during the punching or cutting operation; then, after the heated punch or blade is removed, the melted plastic will cool and solidify, forming a thickened ring of plastic surrounding the hole that has been created.

It also should be recognized that HDPE plastics and most other types of materials contemplated for use herein can be coated or impregnated with chemicals and/or films to provide various traits and benefits, if desired. For example, various known chemicals can reduce friction on the bottom surface of a sled; other known chemicals can render a material more resistant to degradation by ultraviolet radiation or chemicals; and various film-type coatings can make a surface highly reflective, which can allow warming uses (using reflected sunlight), use as a windshield screen to keep the interior of a vehicle from becoming too warm, or use in signaling, to draw the attention of a search or rescue vehicle that may be a long distance away.

It should also be recognized that ultra-light sleds, and rescue sleds, effectively establish a range of useful and convenient lightweight sleds made of flexible plastic sheets. Accordingly, after ultra-light and rescue sleds are described below, various types of "midpoint" sleds are described that can combine and/or balance certain components and traits of the two "endpoint" embodiments, to provide additional options and alternatives.

Throughout the discussion below, descriptive terms that tend to suggest physical shapes for conventional and well-known devices (such as strap, slot, etc.) are used for convenient description of preferred embodiments, and are not intended to limit the invention to certain particular types of components. As one example, in rescue sleds, nylon straps at least about ½ inch wide (preferably about ⅝ to 1 inch, with relatively flat cross-sections for reduced weight and bulk) are generally preferred over ropes with circular cross-sections. There are two reasons for this preference: (i) wide straps can be grabbed by uncovered hands and pulled, lifted, and carried over longer distances, with less discomfort and fatigue in the hands, compared to ropes; and, (ii) if handled properly, widened straps can help distribute tensile and tearing stresses across a wider area of plastic surrounding a hole, thereby reducing the risk that a hole will become torn.

However, despite the preference for straps over ropes, anyone skilled in the art will recognize that any type of rope, cable, lightweight chain, or similar item that can withstand the tensile stresses involved can be sufficient for carrying out the roles and functions of straps as described herein. In addition, it must be recognized that there are overlaps between various terms that describe physical objects of this class. For example, people can argue about the implications of terms such as straps versus belts, and whether the real difference between them depends on the type of buckle or other connector that is used, rather than on the tensile member itself; similarly, if a braided strap/rope has (or can adopt) an oval cross-sectional shape, somewhere between the circular shape of a rope and the flattened shape of a strap, it might be called either a rope or a strap.

Similarly, the description herein uses the term "slot" to describe the preferred type of elongated hole that passes through a sheet of material, which enables a strap to pass through the sheet of material. However, slots also can be referred to by other terms, such as holes, openings, slits, gaps, passages, etc. (they might also be referred to as orifices, apertures, or other terms, although some people might argue that "aperture" requires that an opening must be adjustable in size, and "orifice" requires that some type of fluid or other material must pass through the opening). Accordingly, the term "hole" is used in the claims, since it is a broad term that is not limited to any particular size, shape, or structure. In general, "hole" is used broadly in the claims, to include any type of passageway that has been cut, drilled, stamped, molded into, or otherwise created or provided in a way that enables a strap, rope, or similar item to pass through a sheet of material.

Despite their exceptionally light weight, these sleds can be very tough and durable, even when made of an inexpensive plastic such as HDPE. To provide a "benchmark" standard for toughness that can distinguish rescue sleds from the types of flexible plastic toy sleds that are sold for children to play on after a snowfall, a strength and durability test is set forth herein, which should be regarded as specifying a minimum level of toughness to allow a sled to be suitable for potential use in rescue operations. According to this threshold text, a sled should be strong, tough, and durable enough to allow a distributed load (as can be provided by several sandbags, arranged on the sled in a manner that roughly resembles the torso, head, and legs of a person), weighing an aggregate of 90 kilograms (about 200 pounds), to be dragged across conventional asphalt paving (i.e., an asphalt composite having exposed bits of gravel, as used for conventional street paving) a distance of at least 200 meters.

Asphalt paving, with exposed bits of gravel, acts in a manner comparable to a super-coarse sandpaper, and it will actively and aggressively grind and cut at the underside of a sled carrying a 200-pound load. Therefore, it poses a tougher challenge than will be encountered in most types of outdoor use (such as dragging a load through a forest, across ground surfaces such as dried leaves, grass, etc.). However, in military situations, if a sled must be used to pull a wounded soldier to safety during an ambush or other attack, a dragging distance of 200 yards would almost always be sufficient to allow the wounded soldier to be dragged to an intermediate position of relative safety, where he can be kept sheltered from bullets, shrapnel, or shells while an armored or emergency vehicle attempts to reach him. For both reasons, the durability test specified above provides a "benchmark" level, for evaluation and comparison purposes, that is fully reasonable.

In addition, "dragging distance" tests, using sandbags to determine how many meters or yards a 90 kilogram distributed load can actually be dragged across asphalt paving before a hole with a fixed diameter (such as 2 cm) is worn through the sled, can be used to provide a simple and direct numerical indicator of how tough and durable a sled (or a candidate sled material) actually is, under reasonable conditions reflecting usage.

This type of enhanced sled (referred to herein as a "rescue sled") can be provided by combining: (i) a somewhat thicker and stronger sheet of material than would be preferred for most types of "ultra-light" sleds, with (ii) a strong strap, such as a nylon strap having a width of half an inch or more. The strap is "laced" through a series of slots or other holes that have been cut through the sled, in a way that securely affixes the strap around the periphery of the sled.

This arrangement provides two major benefits: (1) it allows a strap, which can withstand hundreds or even thousands of pounds of tensile force, to distribute any tensile stresses and forces around the periphery and area of a flexible sheet, in ways that minimize any tearing or other stresses that are imposed on any specific part of the flexible sheet; and, (2) it allows strap segments which are exposed on the upper surface of the sled to be used as handles, in a way that can allow a team of two, three, or four people to lift and carry an injured person (or other load) on the sled.

Accordingly, FIG. 1 depicts a flexible lightweight rescue sled 200, comprising a flexible sheet 210 having strap slots 220, towing slots 230 and 232, and optional side handles 240.

FIG. 2 depicts a similar sled 300 without any side handles, comprising flexible sheet 310, peripheral strap 320 which passes through the same types of strap slots 220, and towing strap 340, which is securely attached to peripheral strap 320.

While rescue sleds 200 and 300 are designed and suited for uses such as emergency transport of an injured person, they also can be used for transporting other loads, such as firewood, a deer carcass, building materials, etc.

Sled 200 in FIG. 1 has a main sheet with a layout identical to sled 300 in FIG. 2, except for optional side handles 240. These side handles can be stamped, die-cut, or otherwise cut from the same sheet of material used to make the main body 212 of sled 200. Alternately, side handles 240 can be affixed to main body 212 by other means if desired, such as "welding" (when this is done with plastic, ultrasonic energy is normally used; however, heating and melting of plastic can also be regarded as a method of welding two plastic pieces together), gluing, stitching, riveting, or any combination thereof or any other known means.

The spacing of strap slots 220 is important, and requires attention to both: (i) smaller "spacing segments" 222 between each of the two slots in a pair of strap slots 220, having a width or length designated as variable "A" in FIG. 1; and, (ii) larger "handle segments" 224 between different pairs of paired slots, having a width or length designated as variable "B" in FIG. 1.

The width "A" of the smaller spacing segments 222 is important, because segments 222 will effectively provide the means by which the sled body 212 hangs from, and is lifted and supported by (or is pulled and dragged by), a peripheral strap 320 as shown in FIG. 2.

In analyzing the numbers and spacings of strap slots 220 that should be provided for a lightweight rescue sled, it is assumed that the main body of the sled is created by simply cutting slots into a sheet of HDPE or other plastic, without using grommets, welded O-rings, or other devices to reinforce the slots. This approach is entirely feasible, and can provide highly useful sleds with minimal cost, weight, and bulk when rolled up and carried. However, the strap slots can be reinforced if desired, and if such reinforcements are provided, any numbers and spacings suggested herein can be adjusted accordingly.

It should also be noted that a slot can be cut in a way that will generate one or two small flaps, which will remain attached on either or both sides of the slot. If this is done, the small flaps can be scored and folded back, in a way that can help reinforce the slots.

For illustrative purposes, to avoid rendering the drawing more complicated, FIGS. 1 and 2 indicate eleven pairs of strap slots 220 (excluding the two towing slots 230 and 232). This number is lower than a preferred design that uses 15 pairs of slots, as explained below.

Preferred numbers of paired slots for most rescue sleds will range from at least 9 pairs (which can provide 4 handholds on each side, to allow a team of 4 people (two people on each side) to lift and carry a sled with an injured person on it), preferably at least 11 pairs, and even more preferably at least 13 pairs, up to a maximum of about 15 or possibly even more pairs. If more than about 15 or possibly 17 pairs of slots are provided, they will tend to reduce and limit the "handle segments" 224 (which have the "B" widths shown on FIG. 1) to undesirably small widths.

As indicated above, each pair of strap slots 220 creates a relatively small "spacing segment" 222 between those two slots. Preferred widths "A" for spacing segments 222 will depend to some extent on the strength of the material used to make the sled; for materials such as unreinforced HDPE, the width of each spacing segment 222 generally should be in a range from about 3 to about 5 inches.

If the number of paired slots is fixed, larger widths for spacing segments 222 are not likely to provide major increases in strength and durability for the sled, because tearing actions will not be affected substantially by the widths of spacing segments 222. Instead, tearing forces will focus on a corner or edge of a spacing segment, and a tear will begin if the forces (which will be increased by jostling motions) exceed a certain level, regardless of how far the tear might need to travel before it can break completely through a spacing segment. Accordingly, the number of paired slots (and spacer segments) will have more direct and important effects on tearing and durability than the widths of the spacer segments. As a result, the highest practical and "comfortable" number of paired slots will be preferable, and a preferred embodiment of the sled herein uses 15 slots.

That number may vary, for sleds made of other types of materials, and for sleds having reinforced strap slots. Accordingly, it is possible to carry out computer modeling, to determine optimal numbers and spacings of paired slots around the periphery of a rescue sled made of any particular type or thickness of material. However, that type of modeling can only approximate a number of variables that will arise under field conditions, especially in emergencies. Therefore, any optimization of exact sled dimensions, for any particular type of sled made of a particular material with known dimensions, preferably should be carried out by testing under realistic field conditions, such as by using soldiers or others to haul and drag, or to lift and carry, volunteers or weighted loads over substantial distances in various types of terrains.

The reference to a "peripheral" strap 320 is descriptive of the preferred and illustrated embodiment, but it is not intended to be limiting. In particular, any of several variations could be chosen and used, which would raise questions as to whether the resulting strap is still "peripheral". As one example, a strap could take a "shortcut" across the back end of a sled, at a location that could be 10, 20, or even 30% of the distance toward the front of the sled. As another example, a reinforcing strap could be provided in two parallel segments that would travel down the sides of the sled, but which would not traverse the sled and link together with each other at the tail end of the sled. These approaches generally are not preferred, since they would not provide the same level of strength and reinforcement as the truly peripheral arrangement shown in FIG. 1. Nevertheless, these types of arrangements could provide sleds that in at least some cases would have nearly or roughly the same level of strength as sled 300 having a fully peripheral strap 320.

References herein to a reinforcing strap that is "coupled" to a sled or sheet of plastic are intended to indicate that suitable means are used to attach, affix, secure, or otherwise couple a strap to a sled with sufficient strength to enable and cause the sled to be lifted, dragged, or otherwise moved and transported, when the strap is moved. Such means can be provided conveniently and inexpensively by lacing strap 320 through strap slots 220, as illustrated in FIG. 1. However, other coupling means can be used if desired, including (as examples) rivets, bolts, strong waterproof adhesives, etc., and any combination thereof.

Towing Straps, Loops, Handles, and Belts

Any of various types of straps, ropes, or similar devices, which can be provided with various types of handles, loops, clips, or other gripping, coupling, or securing means, can be adapted for pulling and dragging a loaded sled as disclosed herein.

For example, a handle made of a relatively hard material that can be grasped by both hands, and that will not collapse and squeeze the hands (such as commonly used to tow water skiers), can be adapted for use as disclosed herein. However, handles that are gripped by the hands will cause tiring and fatigue of the hands, shoulders, and arms, especially if used to pull a load that may weigh hundreds of pounds over substantial distances.

Accordingly, a better class of towing device can be provided by a strap having a width of at least about 1 inch, with a small loop in the end. A much larger loop having any desired overall size can be created merely by pushing a segment of strap through the small loop. If desired, a person's head and one arm can be inserted through the loop, effectively creating a shoulder harness that will rest next to the person's neck. This type of shoulder harness can be a major improvement over a hand grip, and if one shoulder gets tired, the loop can be shifted to the other shoulder. However, a shoulder strap also can cause fatigue of the neck and shoulders.

In addition, any efforts to drag a heavily-loaded sled by imposing a load on the arms, shoulders, or chest of a person doing the work will increase, rather than reduce, the amount of work that must be performed to cover a fixed distance. By way of analogy, if a segment of elastic material (such as a bungee cord) is inserted into a tow rope, a person using that rope to drag a heavy load a long distance would end up using energy to stretch the elastic in ways that don't help move the load. The elastic segment becomes a "damping" device that partially absorbs, dissipates, and wastes the energy that is spent stretching it. In a similar manner, if a man tries to use his arms and shoulders to tow a sled, his arm and shoulder muscles will not reduce the amount of work his legs must do; instead, the arms and shoulders will be like semi-elastic damping devices, inserted into a chain that would work better without them. Rather than helping, they will impede the translation of work (by the legs) into results.

Accordingly, a preferred method for dragging and pulling a loaded sled can be accomplished by placing a strap loop directly around the hips, preferably using a rolled-up blanket, vest, towel, or similar device to provide padding. Alternately, an oversized and/or padded belt which is ideally suited for this type of work can be provided by adapting the types of belts that have already been developed for supporting backpacks. Such belts are illustrated, in color photographs, on websites such as www.backpacking.net. Ideally, that type of oversized padded belt can be provided with up to four different attachment rings or clips, on the back, front, left, and right sides of the belt.

When the towing strap or rope is attached to a ring or clip on the back of such a belt, it will allow a person to exert maximum traction and pull while leaning and moving forward. However, if a difficult obstacle (such as a fallen tree, large rock, etc.) requires the person to turn around and watch what is happening while a loaded sled must be somehow pulled over, under, around, or through the obstacle, the rope can be uncoupled from the back ring and attached to the front ring. This will allow the person to pull the load while walking backward, watching and monitoring the sled as it maneuvers past the obstacle.

Similarly, if a heavy load must be dragged a long distance, the user can secure the rope or strap to either of the two side rings, and use a leaning-type walking for a while, similar to a swimmer doing a sidestroke for a while to rest the muscles that are used in freestyle (crawl) or backstroke.

It should also be recognized that the type of towing and pulling motion that will be exerted on a sled as described herein will usually tend to lift up the leading edge of the sled, in a manner that will generate a curled or otherwise slanted, tapered, and/or rounded leading edge. This can make a dragging operation easier, while avoiding or minimizing any scooping, trenching, or similar unwanted actions in which the leading edge of the sled might catch or snag on dirt, leaves, stumps, branches, crop remnants, or other obstacles.

"Midpoint" Sleds, Halfway Between Ultra-Light and Rescue Sleds

In an alternate preferred embodiment, various types of "midpoint" (or hybrid, etc.) sleds can be designed and fabricated that will combine components and advantages from both of the two embodiments discussed above.

As an example, one type of "midpoint" sled can be provided with a relatively thin and lightweight peripheral strap or cord, such as a nylon strap having a width of only about 114 inch, or a nylon cord or rope having a thickness (diameter) of only about 118 inch. Even though they are relatively thin, such straps or cords made of a material such as nylon can have tensile strengths of hundreds of pounds. Accordingly, they can provide additional strength to a sled without major increases in cost or weight, and they also can provide additional options for securing a bulky, cumbersome, and awkward load to a sled.

Other types of "midpoint" sleds can be created by "welding" a reinforcing strip of plastic (or a set of reinforcing rings) to the peripheral rim of a sled, to provide additional reinforcement for the slots or holes that will penetrate the main layer of the sled and provide coupling means for a peripheral strap. This type of plastic "welding" can be done using ultrasonic energy input, which has been widely adopted in recent years for affixing two pieces of plastic to each other.

Similarly, metal or plastic grommets or similar devices can be used to reinforce any or all of the slots or holes that will penetrate the main layer of a sled.

Alternately or additionally, a heated tool (comparable to a soldering iron or heated blade) can be used to cut and/or melt a slot or hole through the main layer of a sled, in a way that creates a melted ring of plastic material around the heated tool. When the ring of melted plastic cools and hardens after the tool is removed, it will create a ring of hardened reinforcing plastic around the slot or hole, thereby reducing the risk of tearing.

Thus, there has been shown and described a new and useful class of lightweight and flexible sleds for transporting inert loads, or humans in need of transport. Although this invention has been exemplified for purposes of illustration and description by reference to certain specific embodiments, it will be apparent to those skilled in the art that various modifications, alterations, and equivalents of the illustrated examples are possible. Any such changes which derive directly from the teachings herein, and which do not depart from the spirit and scope of the invention, are deemed to be covered by this invention.

The invention claimed is:

1. A sled suited for receiving a human so that a person may transport the human by towing the sled in a dragging operation, the sled comprising:

a sled body including top and bottom surfaces, a front end, two sides, a tail end, and a length and width that render the sled body capable of receiving a human lying down on the top surface of the sled body to transport the human, the sled body further including a longitudinal axis, a periphery and a peripheral edge margin extending inward from the periphery, the peripheral edge margin extending around the periphery of the sled body along the front end, two sides, and tail end, the sled body having at least one hole formed in the peripheral edge margin of the sled body, said at least one hole including a hole in a portion of the peripheral edge margin adjacent the front end of the sled body;

a towing strap portion threaded through the hole in the portion of the peripheral edge margin portion adjacent the front end of the sled body, the towing strap portion having a generally flat cross section and being threaded through said hole in the portion of the peripheral edge margin portion adjacent the front end of the sled body so that a part of the towing strap portion has a length extending forward from the front end of the sled body free from engagement with the sled body for pulling by the person to tow the sled body, another part of the towing strap portion extending from adjacent the front end of the sled body toward the tail end of the sled body, at least one segment of said another part of the towing strap portion extending along the sled body and lying in flatwise engagement with the sled body; and a second strap portion, the second strap portion being threaded through at least one hole formed in the sled body other than said at least one hole through which the towing strap portion is threaded through, the towing strap portion being connected to the second strap portion for securing the towing strap portion to the sled body for distributing tensile forces applied to the towing strap portion in towing the sled body to the sled body via the second strap portion;

wherein the hole in the portion of the peripheral edge margin portion adjacent the front end of the sled body through which the towing strap portion is threaded is positioned on the longitudinal axis of the sled body.

2. A sled according to claim 1 wherein the second strap portion includes first and second segments threaded through the sled body on respective opposite sides of the longitudinal axis of the sled body.

3. A sled according to claim 2 wherein said first and second segments of the second strap portion are threaded through the sled body adjacent the front end of the sled body on respective opposite sides of the longitudinal axis of the sled body.

4. A sled according to claim 3 wherein the second strap portion forms a generally "U" shape, the "U" shape including second strap portion parts on respective opposite sides of the longitudinal axis of the sled body.

5. A sled according to claim 3 wherein the second strap portion forms a loop having parts on respective opposite sides of the longitudinal axis of the sled body.

6. A sled according to claim 2 wherein the sled body includes an intermediate section between the head end and the tail end of the sled body, and wherein said first and second segments of the second strap portion are threaded through the sled body in the intermediate section of the sled body on respective opposite sides of the longitudinal axis of the sled body.

7. A sled according to claim 6 wherein the second strap portion forms a generally "U" shape, the "U" shape including second strap portion parts on respective opposite sides of the longitudinal axis of the sled body.

8. A sled according to claim 6 wherein the second strap portion forms a loop having parts on respective opposite sides of the longitudinal axis of the sled body.

9. A sled according to claim 2 wherein said first and second segments of the second strap portion are threaded through the sled body along the peripheral edge margin of the sled body on respective opposite sides of the longitudinal axis of the sled body.

10. A sled according to claim 9 wherein the second strap portion forms a generally "U" shape, the "U" shape including second strap portion parts on respective opposite sides of the longitudinal axis of the sled body.

11. A sled according to claim 9 wherein the second strap portion forms a loop having parts on respective opposite sides of the longitudinal axis of the sled body.

12. A sled according to claim 2 wherein the towing strap portion is connected to the second strap portion such that tensile forces from towing the sled body by the towing strap portion are distributed symmetrically to the second strap portion on opposite sides of the longitudinal axis of the sled body.

13. A sled according to claim 2 wherein said first and second segments of the second strap portion are threaded through the sled body adjacent the tail end of the sled body on respective opposite sides of the longitudinal axis of the sled body.

14. A sled according to claim 2 wherein the second strap portion forms a loop having parts on respective opposite sides of the longitudinal axis of the sled body, the loop being generally symmetrical with respect to the longitudinal axis of the sled body.

15. A sled according to claim 1 wherein at least a segment of the second strap portion along a length of the second strap portion extends widthwise with respect to the sled body.

16. A sled according to claim 1 wherein the second strap portion forms a loop.

17. A sled according to claim 1 wherein the second strap portion includes at least one segment extending along the peripheral edge margin of the sled body.

18. A sled according to claim 1 wherein the at least one segment of said another part of the towing strap portion lies in flatwise engagement with a bottom surface of the sled body.

19. A sled suited for receiving a human so that a person may transport the human by towing the sled in a dragging operation, the sled comprising:

a sled body including top and bottom surfaces, a front end, two sides, a tail end, and a length and width that render the sled body capable of receiving a human lying down on the top surface of the sled body to transport the human, the sled body further including a longitudinal axis, a periphery and a peripheral edge margin extending inward from the periphery, the peripheral edge margin extending around the periphery of the sled body along the front end, two sides, and tail end, the sled body having at least one hole formed in the peripheral edge margin of the sled body, said at least one hole including a hole in a portion of the peripheral edge margin adjacent the front end of the sled body;

a towing strap portion threaded through the hole in the portion of the peripheral edge margin portion adjacent the front end of the sled body, the towing strap portion having a generally flat cross section and being threaded through said hole in the portion of the peripheral edge margin portion adjacent the front end of the sled body so that a part of the towing strap portion has a length extending forward from the front end of the sled body free from engagement with the sled body for pulling by the person to tow the sled body, another part of the towing strap portion extending from adjacent the front end of the sled body toward the tail end of the sled body, at least one segment of said another part of the towing strap portion extending along the sled body and lying in flatwise engagement with the sled body; and a second strap portion, the second strap portion being threaded through at least one hole formed in the sled body other than said at least one hole through which the towing strap portion is threaded through, the towing strap portion being connected to the second strap portion for securing the towing strap portion to the sled body for distributing tensile forces applied to the towing strap portion in towing the sled body to the sled body via the second strap portion, the second strap portion including first and second segments threaded through the sled body on respective opposite sides of the longitudinal axis of the sled body;

wherein the second strap portion forms a generally "U" shape, the "U" shape including second strap portion parts on respective opposite sides of the longitudinal axis of the sled body and extending generally lengthwise of the sled body, the "U" shape being generally symmetrical with respect to the longitudinal axis of the sled body.

* * * * *